United States Patent
Dasgupta et al.

(10) Patent No.: US 8,046,317 B2
(45) Date of Patent: Oct. 25, 2011

(54) SYSTEM AND METHOD OF FEATURE SELECTION FOR TEXT CLASSIFICATION USING SUBSPACE SAMPLING

(75) Inventors: Anirban Dasgupta, Berkeley, CA (US); Petros Drineas, Troy, NY (US); Boulos Harb, Brooklyn, NY (US); Vanja Josifovski, Los Gatos, CA (US); Michael William Mahoney, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 969 days.

(21) Appl. No.: 12/006,178

(22) Filed: Dec. 31, 2007

(65) Prior Publication Data

US 2009/0171870 A1  Jul. 2, 2009

(51) Int. Cl.
*G06N 5/00* (2006.01)
(52) U.S. Cl. .......................... 706/45; 706/12
(58) Field of Classification Search ............... 706/12, 706/45
See application file for complete search history.

(56) References Cited

U.S. PATENT DOCUMENTS

2008/0082475 A1 * 4/2008 Aggarwal et al. ............... 706/48

OTHER PUBLICATIONS

Dasgupta et al ("Feature Selection Methods for Text Classification" KDD'07).*
Drineas et al ("Relative-Error CUR Matrix Decompositions" Aug. 27, 2007), downloaded at http://arxiv.org/PS_cache/arxiv/pdf/0708/0708.3696v1.pdf.*
Drineas et al ("Sampling Algorithms and Coresets for Lp Regression" Jul. 11, 2007), downloaded at http://arxiv.org/PS_cache/arxiv/pdf/0707/0707.1714v1.pdf.*
Drineas et al ("Sampling algorithms for l2 regression and applications" Jan. 2006), downloaded at http://portal.acm.org/citation.cfm?id=1109557.1109682.*
Gabrilovich et al ("Text Categorization with Many Redundant Features: Using Aggressive Feature Selection to Make SVMs Competitive with C4.5" 2004).*
Drineas et al ("Subspace Sampling and Relative-Error Matrix Approximation: Column-Based Methods" APPROX and RANDOM Aug. 28-30, 2006).*

* cited by examiner

*Primary Examiner* — Jeffrey A Gaffin
*Assistant Examiner* — Lut Wong
(74) *Attorney, Agent, or Firm* — Buchenhorner Patent Law

(57) ABSTRACT

An improved system and method is provided for feature selection for text classification using subspace sampling. A text classifier generator may be provided for selecting a small set of features using subspace sampling from the corpus of training data to train a text classifier for using the small set of features for classification of texts. To select the small set of features, a subspace of features from the corpus of training data may be randomly sampled according to a probability distribution over the set of features where a probability may be assigned to each of the features that is proportional to the square of the Euclidean norms of the rows of left singular vectors of a matrix of the features representing the corpus of training texts. The small set of features may classify texts using only the relevant features among a very large number of training features.

12 Claims, 4 Drawing Sheets

SYSTEM AND METHOD OF FEATURE SELECTION FOR TEXT CLASSIFICATION USING SUBSPACE SAMPLING

FIELD OF THE INVENTION

The invention relates generally to computer systems, and more particularly to an improved system and method of feature selection for text classification using subspace sampling.

BACKGROUND OF THE INVENTION

Text classification, the task of automatically assigning categories to natural language text, has become one of the key methods for organizing online information. Automated text classification is a particularly challenging task in modern data analysis, both from an empirical and from a theoretical perspective. This problem is of central interest in many internet applications, and consequently it has received attention from researchers in such diverse areas as information retrieval, machine learning, and the theory of algorithms. Challenges associated with automated text categorization come from many fronts: an appropriate data structure must be chosen to represent the documents; an appropriate objective function must be chosen to optimize in order to avoid over fitting and obtain good generalization; and algorithmic issues arising as a result of the high formal dimensionality of the data must be addressed.

Feature selection of a subset of the features available for describing the data before applying a learning algorithm is a common technique for addressing this last challenge. See for example, A. L. Blum and P. Langley, *Selection of Relevant Features and Examples in Machine Learning*, Artificial Intelligence, 97:245-271, 1997; G. Forman, *An Extensive Empirical Study of Feature-Selection Metrics for Text Classification*, Journal of Machine Learning Research, 3:1289-1305, 2003; and I. Guyon and A. Elisseeff, *An Introduction to Variable and Feature Selection*, Journal of Machine Learning Research, 3:1157-1182, 2003. It has been widely observed that feature selection can be a powerful tool for simplifying or speeding up computations, and when employed appropriately it can lead to little loss in classification quality. Nevertheless, general theoretical performance guarantees are modest and it is often difficult to claim more than a vague intuitive understanding of why a particular feature selection algorithm performs well when it does. Indeed, selecting an optimal set of features is in general difficult, both theoretically and empirically, and in practice greedy heuristics are often employed.

Recent work in applied data analysis—for example, work on Regularized Least Squares Classification (RLSC), Support Vector Machine (SVM) classification, and the Lasso shrinkage and selection method for linear regression and classification employ the Singular Value Decomposition, which, upon truncation, results in a small number of dimensions, each of which is a linear combination of up to all of the original features. See for example, D. Fragoudis, D. Meretakis, and S. Likothanassis, *Integrating Feature and Instance Selection for Text Classification*, In Proceedings of the 8th Annual ACM SIGKDD Conference, pages 501-506, 2002, and T. Joachims, *Text Categorization with Support Vector Machines: Learning with Many Relevant Features*, In Proceedings of the 10th European Conference on Machine Learning, pages 137-142, 1998. Although RLSC performs comparable to the popular SVMs for text categorization, RLSC is conceptually and theoretically simpler than SVMs, since RLSC can be solved with vector space operations instead of convex optimization techniques required by SVMs. In practice, however, RLSC is often slower, in particular for problems where the mapping to the feature space is not the identity. For a nice overview, see R. Rifkin, *Everything Old Is New Again: A Fresh Look at Historical Approaches in Machine Learning*, PhD thesis, Massachusetts Institute of Technology, 2002, and R. Rifkin, G. Yeo, and T. Poggio, *Regularized Least-Squares Classification*, in J. A. K. Suykens, G. Horvath, S. Basu, C. Micchelli, and J. Vandewalle, editors, Advances in Learning Theory: Methods, Models and Applications, NATO Science Series III: Computer and Systems Sciences, pages 131-154. VIOS Press, 2003.

What is needed is a system and method for RLSC to efficiently learn classifications function and perform feature selection to find a small set of features that may preserve the relevant geometric structure in the data. Such a system and method should be able to be used by online applications for text classification where the text content may change rapidly.

SUMMARY OF THE INVENTION

Briefly, the present invention may provide a system and method of feature selection for text classification using subspace sampling. A text classifier generator may be provided for learning classification functions and may include a feature selector for selecting a small set of features using subspace sampling from the corpus of training data to train a text classifier for using the small set of features selected by subspace sampling for classification of texts. The small set of features may classify texts using only the relevant features among a very large number of training features. In an embodiment, the small set of features may be selected by randomly sampling features according to a probability distribution over the set of training features.

In general, features of a corpus of training data may be sampled according to an input probability distribution and a small set of features may be selected. A kernel matrix may be defined over the small set of features selected from a randomly sampled subspace of the training features, and an optimal vector representing the small set of features may be defined using regularized least-squares classification that may characterize a classification function using the kernel matrix. An unseen text may then be classified using the classification function. In various embodiments, a text classifier may be generated for using the small set of features selected by subspace sampling for classification of texts.

To select the small set of features, a subspace of features from the corpus of training data may be randomly sampled in an embodiment according to a probability distribution over the set of features where a probability may be assigned to each of the features that is proportional to the square of the Euclidean norms of the rows of left singular vectors of a matrix of the features representing the corpus of training texts. The present invention may flexibly use other probability distributions for randomly sampling features. For instance, weight-based sampling of features may be used, where the probability of choosing each feature is proportional to the length squared of the corresponding row of a matrix of the features representing the corpus of training texts. Or, uniform sampling of features may be used, where the probability of choosing each feature is equal.

Advantageously, the present invention may be used by many applications for feature selection for text classification using subspace sampling. For example, a document classification application may use the present invention to select only the relevant features among a very large number of features to speed up classification of documents. Many other internet applications may use the present invention for text classification where the content of web pages such as chat pages, blog pages, a stream of news items, email, and so forth, may change rapidly, and classification of a web page may be performed online to select content. For any of these applications, the present invention may be used, especially when computational resources including memory, processing time, and network transmission time, require that textual content be represented using a small number of features.

Other advantages will become apparent from the following detailed description when taken in conjunction with the drawings, in which:

DETAILED DESCRIPTION

Exemplary Operating Environment

Figure 1:
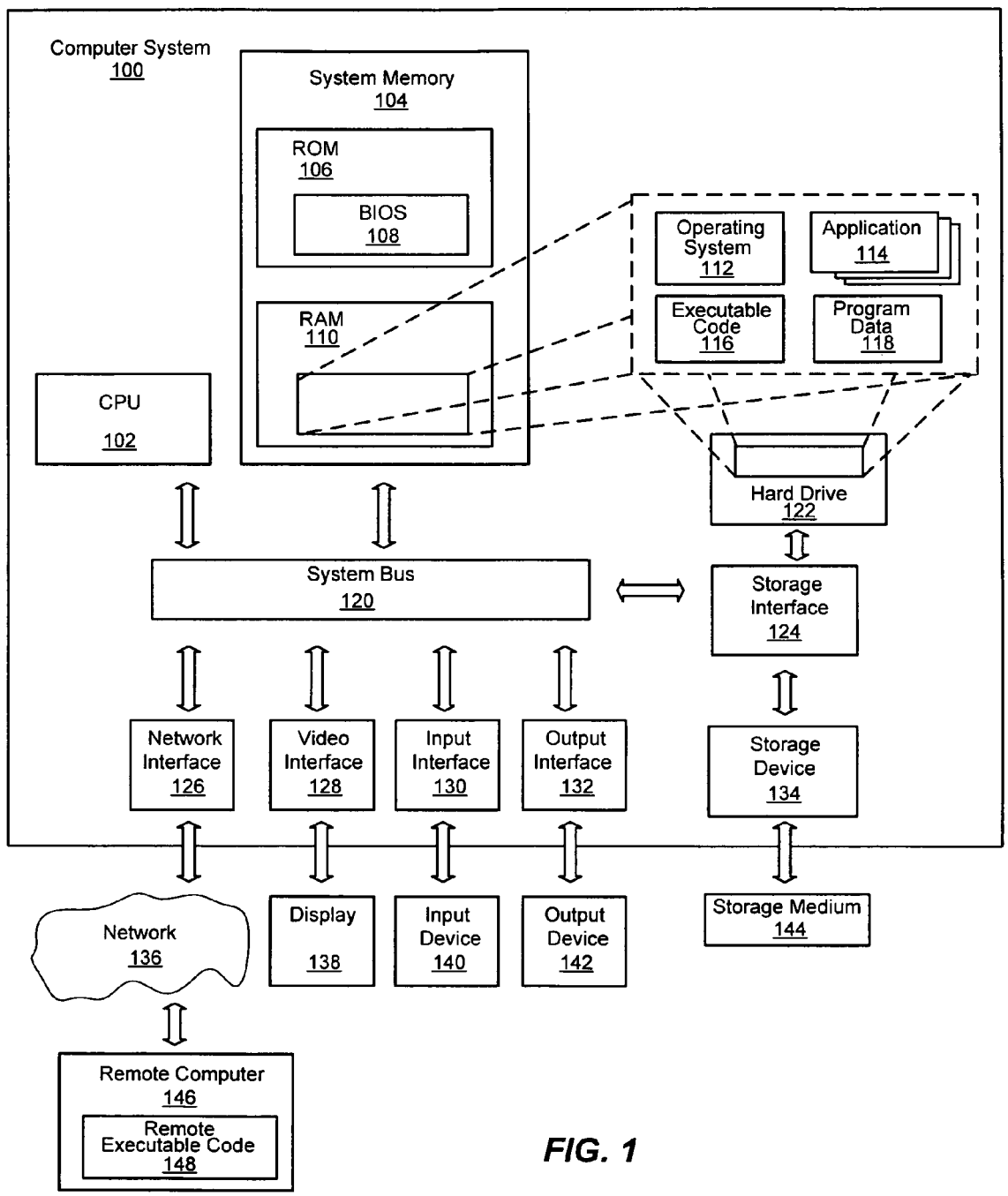
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118.

A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Feature Selection for Text Classification Using Subspace Sampling

The present invention is generally directed towards a system and method of feature selection for text classification using subspace sampling. A text as used herein may mean a document, web page, email or other representation of a set of characters. A simple unsupervised algorithm for feature selection is presented and applied to the RLSC problem. In particular, a subspace of features from a corpus of training data may be randomly sampled according to a probability distribution over the set of training features. Accordingly, a univariate "score" or "importance" may be assigned to every feature, then a small number of features may be randomly sampled, and the RLSC problem induced on those features may be solved.

As will be seen, the present invention chooses a small number of these features that preserve the relevant geometric structure in the data by using a sufficiently simple and sufficiently rich feature selection strategy that may perform well when evaluated against common feature selection algorithms. As will be understood, the various block diagrams, flow charts and scenarios described herein are only examples, and there are many other scenarios to which the present invention will apply.

Figure 2:
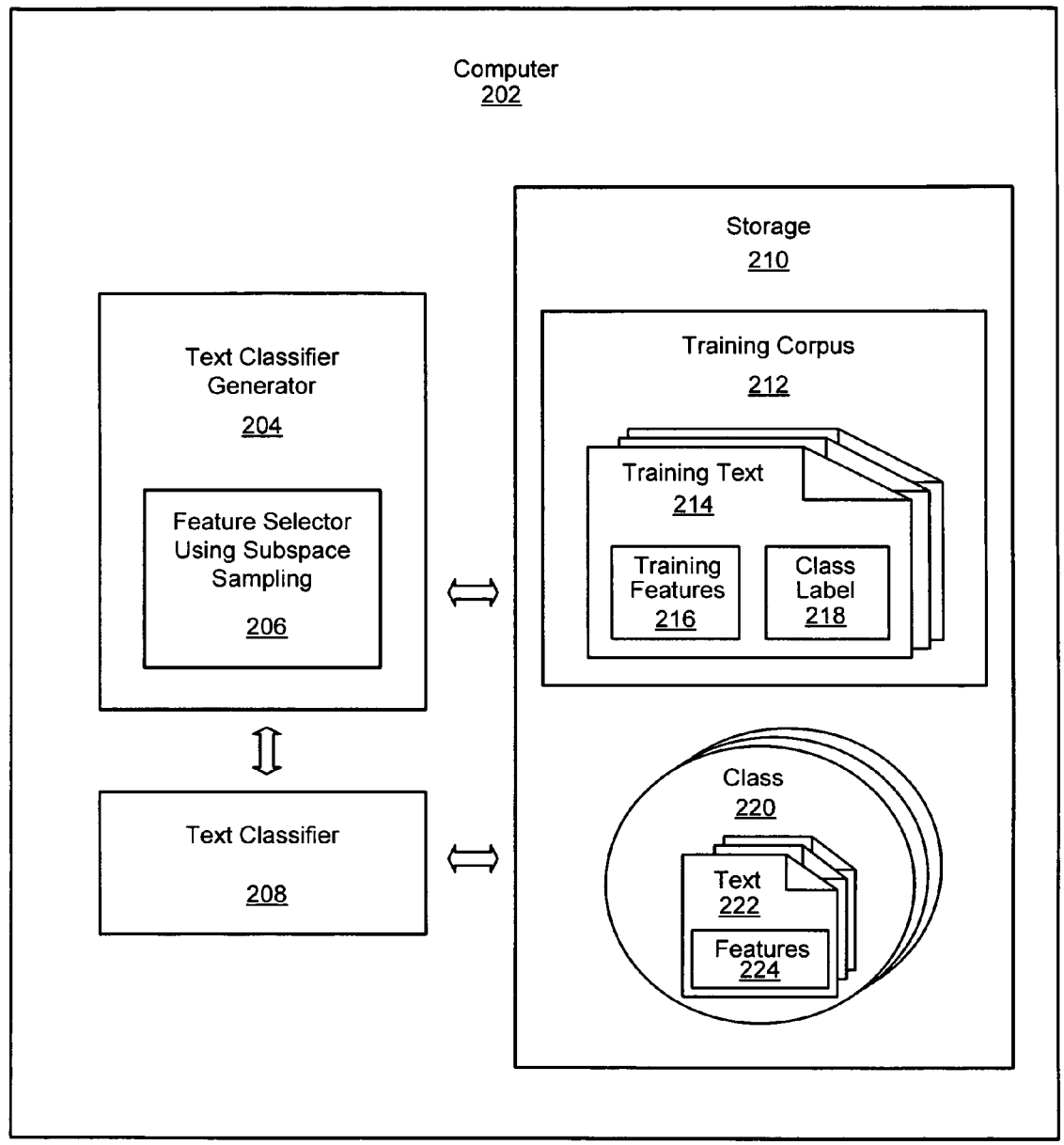
FIG. 2 is a block diagram generally representing an exemplary architecture of system components for feature selection for text classification using subspace sampling, in accordance with an aspect of the present invention.

Turning to FIG. 2 of the drawings, there is shown a block diagram generally representing an exemplary architecture of system components for feature selection for text classification using subspace sampling. Those skilled in the art will appreciate that the functionality implemented within the blocks illustrated in the diagram may be implemented as separate components or the functionality of several or all of the blocks may be implemented within a single component. For example, the functionality of the feature selector using subspace sampling 206 may be implemented as a separate component from the text classifier generator 204. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a text classifier generator 204 operably coupled to a text classifier 208 and storage 210. In general, the text classifier generator 204 and the text classifier 208 may be any type of executable software code such as a kernel component, an application program, a linked library, an object with methods, and so forth. The storage 210 may be any type of computer-readable media and may store a training corpus 212 of training texts 214, each described by training features 216 and a class label 218, and classes 220 of texts 222 classified by a set of selected features 224. In an embodiment, training features 216 from the training corpus 212 may be used by the text classifier generator 204 to train a text classifier 208 to classify unseen texts 222 into classes 220 by a set of selected features 224.

The text classifier generator 204 may learn classification functions for each of the classes and may include a feature selector using subspace sampling 206 for training a text classifier 208 by selecting a small number of features using subspace sampling. Each of these modules may also be any type of executable software code such as a kernel component, an application program, a linked library, an object with methods, or other type of executable software code. Upon selecting a small number of features, a text classifier 208 may be output with the small set of features for classifying unseen texts.

There are many applications which may use the present invention of feature selection for text classification using subspace sampling. Many internet applications that use automated text classification can involve many categories and a very large feature space where the features consist of a large vocabulary of words and phrases that may be many times the size of the representation of a text. For example, a document classification application may use the present invention to select only the relevant features among a very large number of features to speed up classification of documents. Many other internet applications may use the present invention for text classification where the content of web pages such as chat pages, blog pages, a stream of news items, email, and so forth, may change rapidly, and classification of a web page may be performed online to select content. For any of these applications, the present invention may be used, especially when computational resources including memory, processing time, and network transmission time, require that textual content be represented using a small number of features.

In general, learning a classification function can be regarded as approximating a multivariate function from sparse data. This problem is solved in classical regularization theory by finding a function $f$ that simultaneously has small empirical error and small norm in a Reproducing Kernel Hilbert Space (RKHS). That is, if the data consist of d examples $(z_1, y_1), \ldots, (z_d, y_d)$, where $z_i \in \Re^d$ and $y_i \in \{-1, +1\}$, then a Tikhonov regularization problem may be solved to find a function $f$ that minimizes $$\min_{f \in H} \sum_{i=1}^{d} V(y_i, f(z_i)) + \lambda \|f\|_K^2,$$

where $V(.,.)$ is a loss function, $\|f\|_K$ is a norm in a RKHS H defined by the positive definite function K, d is the number of data points, and λ is a regularization parameter. See, for example, T. Evgeniou, M. Pontil, and T. Poggio, *Regularization Networks and Support Vector Machines*, Advances in Computational Mathematics, 13(1):1-50, 1999; A. N. Tikhonov and V. Y. Arsenin, *Solutions of Ill-Posed Problems*, W. H. Winston, Washington, D.C., 1977; and V. N. Vapnik, *Statistical Learning Theory*, Wiley, New York, 1998. Under general conditions, any $f \in H$ minimizing $$\min_{f \in H} \sum_{i=1}^{d} V(y_i, f(z_i)) + \lambda \|f\|_K^2$$

admits a representation of the form:

$$f(q) = \sum_{i=1}^{d} x_i K(q, z_i),$$

for some set of coefficients $x_i$, $i=\{1, \ldots, d\}$. See Bernhard Scholkopf, Ralf Herbrich, Alex J. Smola, and Robert C. Williamson, *A Generalized Representer Theorem*, In Proceedings of the 14th Annual Conference on Computational Learning Theory (COLT2001) and the 5th European Conference on Computational Learning Theory (EuroCOLT 2001), pages 416-426, 2001. Thus, the optimization problem $$\min_{f \in H} \sum_{i=1}^{d} V(y_i, f(z_i)) + \lambda \|f\|_K^2$$

can be reduced to finding a set of coefficients $x_i$, $i=\{1, \ldots, d\}$. The theory of Vapnik then justifies the use of regularization functionals of the form appearing in $$\min_{f \in H} \sum_{i=1}^{d} V(y_i, f(z_i)) + \lambda \|f\|_K^2$$

for learning from finite data sets. If one chooses the square loss function, $V(y, f(z)) = (y - f(z))^2$, then, by combining $V(y, f(z)) = (y - f(z))^2$ with $$\min_{f \in H} \sum_{i=1}^{d} V(y_i, f(z_i)) + \lambda \|f\|_K^2 \text{ and } f(q) = \sum_{i=1}^{d} x_i K(q, z_i),$$

the following Regularized Least Squares Classification (RLSC) problem may be obtained:

$$\min_{x \in \mathbb{R}^d} \|Kx - y\|_2^2 + \lambda x^T Kx,$$

where the d×d kernel matrix K is defined over the finite training data set and y is a d-dimensional $\{\pm 1\}$ class label vector. See for example T. Evgeniou, M. Pontil, and T. Poggio, *Regularization Networks and Support Vector Machines*, Advances in Computational Mathematics, 13(1):1-50, 1999; and R. Rifkin, G. Yeo, and T. Poggio, *Regularized Least-squares Classification*, in J. A. K. Suykens, G. Horvath, S. Basu, C. Micchelli, and J. Vandewalle, editors, Advances in Learning Theory: Methods, Models and Applications, NATO Science Series III: Computer and Systems Sciences, pages 131-154. VIOS Press, 2003.

As is standard, a document may be represented by an n-dimensional feature vector, and thus a corpus of d training documents may be represented as an n×d matrix A. Similarly, an identity mapping to the feature space may be represented by a kernel expressed as $K = A^T A$. If the Singular Value Decomposition (SVD) of A is $A = U \Sigma V^T$, then the solution and residual of $$\min_{x \in \mathbb{R}^d} \|Kx - y\|_2^2 + \lambda x^T Kx$$

may be expressed as: $x_{OPT} = V(\Sigma^2 + \lambda I)^{-1} V^T y$. The vector $x_{OPT}$ characterizes a classification function of the form $$f(q) = \sum_{i=1}^{d} x_i K(q, z_i)$$

that generalizes well to new data. Thus, if $q \in \mathbb{R}^n$ is a new test or query document, then from $$f(q) = \sum_{i=1}^{d} x_i K(q, z_i)$$

the following binary classification function may be derived: $f(q) = x_{OPT}^T A^T q$. That is, given a new document q to be classified, if $f(q) > 0$ then q is classified as belonging to the class in question, and not otherwise.

Accordingly, a regularized least-squares classification problem of the form $$\min_{x \in \mathbb{R}^d} \|Kx - y\|_2^2 + \lambda x^T Kx$$

may be solved exactly or approximately to get a vector to classify successfully a new document according to a classification function of the form $f(q) = x_{OPT}^T A^T q$. By choosing a small number r of features, where $d < r \ll n$, good classification quality may be obtained by using only those r features when compared to using the full set of n features. In an embodiment, feature selection and classification may generally be implemented by the following pseudo-code using sampling for Regularized Least Squares classification:

---
SRLS Algorithm
---

Input: $A \in \mathbb{R}^{n \times d}$; $y \in \mathbb{R}^d$; $q \in \mathbb{R}^n$; $\lambda \in \mathbb{R}^+$; $\{p_i \in [0,1]: i \in [n], p_i \geq 0, \Sigma_i p_i = 1\}$, and a positive integer $r \leq n$.
Output: A solution vector $\tilde{x}_{OPT} \in \mathbb{R}^d$; a residual $\tilde{Z} \in \mathbb{R}$; and a classification $\tilde{f}$.
for $i = 1, \ldots, n$ do
    Pick i with probability $\tilde{p}_i = \min\{1, rp_i\}$;
    if i is picked then
        Include $A_{(i)}/\sqrt{\tilde{p}_i}$ as a row of $\tilde{A}$;

-continued

SRLS Algorithm

Include $q_i/\sqrt{\tilde{p}_i}$ as the corresponding element of $\tilde{q}$;
end
Set $\tilde{K} = \tilde{A}^T \tilde{A}$;

Solve $\tilde{x}_{OPT} = \arg\min_{x \in \mathfrak{R}^d} \|\tilde{K}x - y\|_2^2 + \lambda x^T \tilde{K} x$;

Set $\tilde{Z} = \|\tilde{K}\tilde{x}_{OPT} - y\|_2^2 + \lambda \tilde{x}_{OPT}^T \tilde{K} \tilde{x}_{OPT}$;

Compute $\tilde{f} = f(\tilde{q}) = \tilde{q}^T \tilde{A} \tilde{x}_{OPT}$.

The SRLS Algorithm may take as input the n×d term-document (or feature-document) matrix A, a vector $y \in \mathfrak{R}^d$ of document labels where sign($y_j$) labels the class of document $A^{(j)}$ (where $A^{(j)}$ denotes the $j^{th}$ column of the matrix A and $A_{(i)}$ denotes the $i^{th}$ row of A), and a query document $q \in \mathfrak{R}^n$. The SRLS Algorithm also takes as input a regularization parameter $\lambda \in \mathfrak{R}^+$, a probability n distribution $\{p_i\}_{i=1}^n$ over the features, and a positive integer r. The algorithm first randomly samples roughly r features according to the input probability distribution. Consider $\tilde{A}$ be the matrix whose rows consist of the chosen feature vectors, rescaled appropriately, and consider $\tilde{q}$ be the vector consisting of the corresponding elements of the input query document q, rescaled in the same manner. Then, if the d×d matrix $\tilde{K} = \tilde{A}^T \tilde{A}$ may be defined as an approximate kernel, the algorithm next solves the following RLSC problem:

$$\min_{x \in \mathbb{R}^d} \|\tilde{K}x - y\|_2^2 + \lambda x^T \tilde{K} x,$$

thereby obtaining an optimal vector $\tilde{x}_{OPT}$. Finally, the algorithm classifies the query q by computing, $\tilde{f} = f(\tilde{q}) = \tilde{q}^T \tilde{A} \tilde{x}_{OPT}$. If $\tilde{f} \geq 0$, then q is labeled 'positive'; and otherwise, q is labeled 'negative'.

Figure 3:
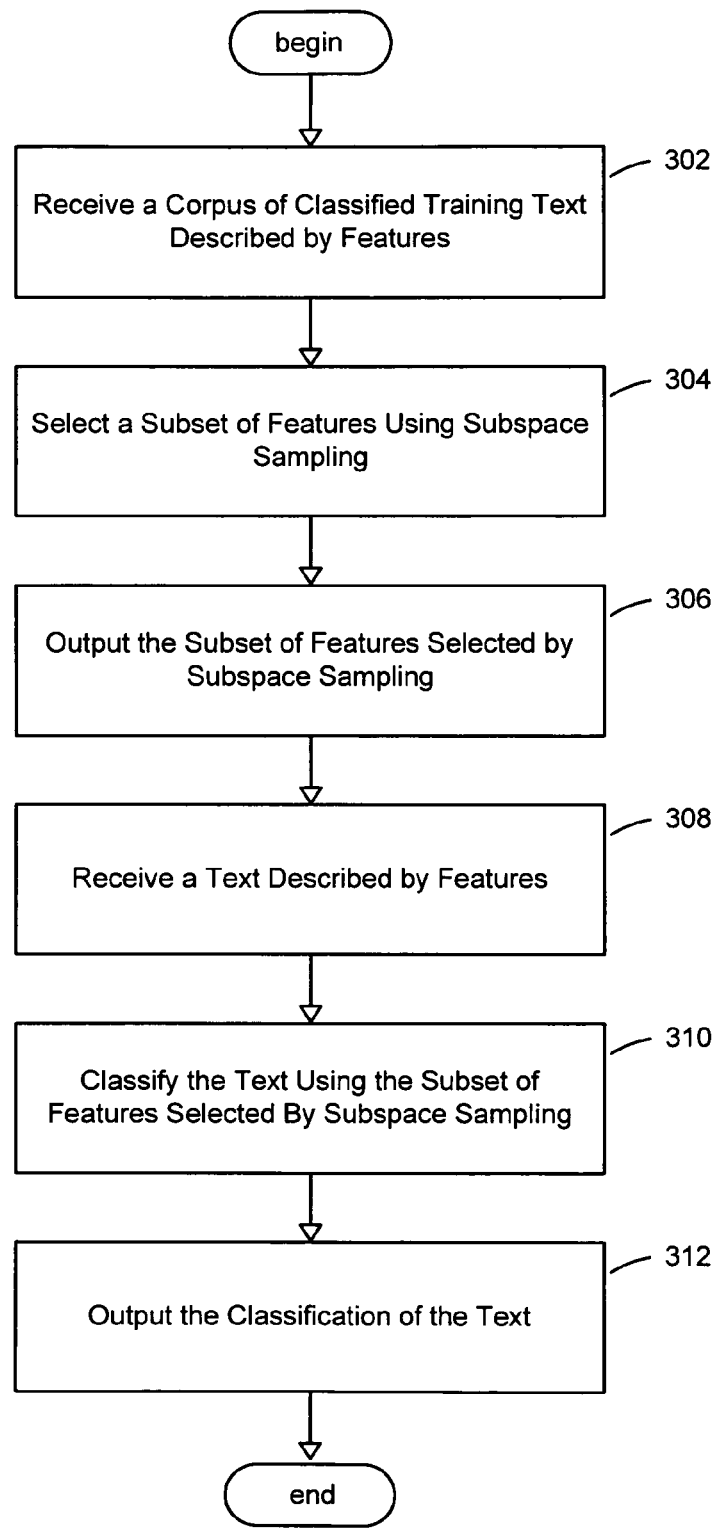
FIG. 3 is a flowchart generally representing the steps undertaken in one embodiment for feature selection for text classification using subspace sampling, in accordance with an aspect of the present invention.

FIG. 3 presents a flowchart generally representing the steps undertaken in one embodiment for feature selection for text classification using subspace sampling. The steps of FIG. 3 represent the general steps of the pseudo-code of the SRLS Algorithm presented above. At step 302, a corpus of classified training texts described by features may be received. For instance, an n×d term-document (or feature-document) matrix A and a vector $y \in \mathfrak{R}^d$ of document labels where sign($y_j$) labels the class of document $A^{(j)}$ may be received as input to the SRLS Algorithm. At step 304, a subset of features may be selected using subspace sampling. In particular, a subspace of features may be randomly sampled according to a probability distribution over the set of features. This is described in more detail in conjunction with FIG. 4 below. The subset of features selected by subspace sampling may be output at step 306. The SRLS Algorithm may obtain and store an optimal vector $\tilde{x}_{OPT}$ by solving the RLSC problem:

$$\min_{x \in \mathbb{R}^d} \|\tilde{K}x - y\|_2^2 + \lambda x^T \tilde{K} x.$$

At step 308, a text described by features may be received, such as a query document $q \in \mathfrak{R}^n$. At step 310, the text may be classified using the subset of features selected by subspace sampling. For instance, the SRLS Algorithm classifies the query q by computing, $\tilde{f} = f(\tilde{q}) = \tilde{q}^T \tilde{A} \tilde{x}_{OPT}$. And at step 312, the classification of the text may be output. For example, if $\tilde{f} \geq 0$ upon computing $\tilde{f} = f(\tilde{q}) = \tilde{q}^T \tilde{A} \tilde{x}_{OPT}$, then q is labeled 'positive' as a document label indicating q belongs to the class; and otherwise, q is labeled 'negative'.

Figure 4:
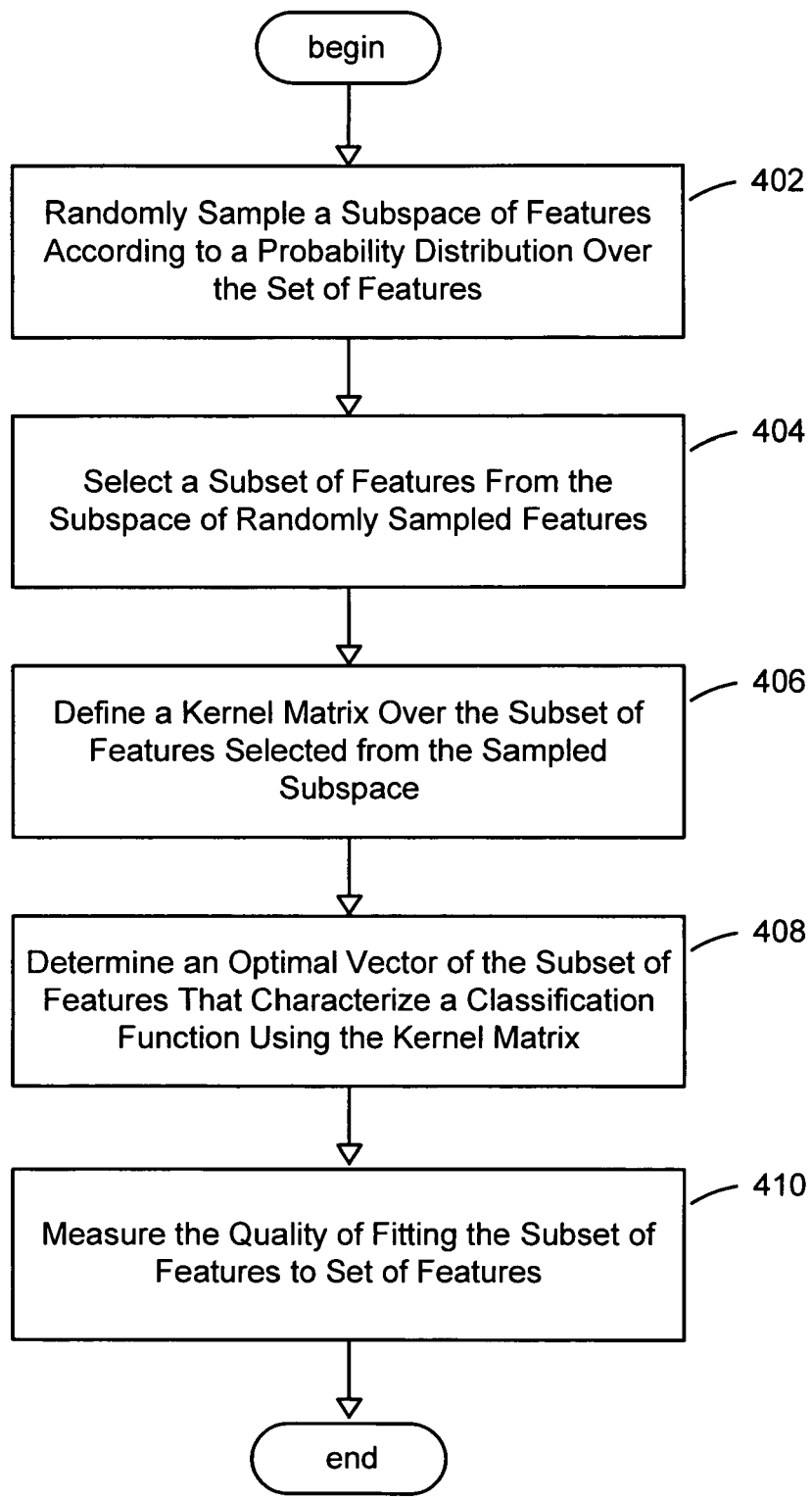
FIG. 4 is a flowchart generally representing the steps undertaken in an embodiment for selecting a subset of features using subspace sampling, in accordance with an aspect of the present invention.

FIG. 4 presents a flowchart generally representing the steps undertaken in one embodiment for selecting a subset of features using subspace sampling. At step 402, a subspace of features may be randomly sampled according to a probability distribution over the set of features. Considering all n features, a feature may be randomly selected in an embodiment by probability, $\tilde{p}_i = \min\{1, rp_i\}$, according to a probability distribution over the set of features such as subspace sampling probability $p_i = \|U_{k(i)}\|_2^2 / k$, where the probability of choosing each feature is proportional to the length squared of the corresponding row of the matrix $U_k$ consisting of the top k left singular vectors of A. At step 404, a subset of features may be selected from the subspace of randomly sampled features. In an embodiment, $A_{(i)}/\sqrt{\tilde{p}_i}$ may be included as a row of $\tilde{A}$ for each feature randomly selected. For example, the SRLS Algorithm computes, for every $i \in \{1, \ldots, n\}$, a probability $\tilde{p}_i = \min\{1, rp_i\} \in [0,1]$, and then the $i^{th}$ row of A is chosen with probability $\tilde{p}_i$. At step 406, a kernel matrix may be defined over the subset of features selected from the subspace of randomly sampled features, and an optimal vector of the subset of features that characterize a classification function using the kernel matrix may be determined at step 408. For instance, the d×d matrix $\tilde{K} = \tilde{A}^T \tilde{A}$ may be defined as an approximate kernel, and the SRLS Algorithm solves $$\min_{x \in \mathbb{R}^d} \|\tilde{K}x - y\|_2^2 + \lambda x^T \tilde{K} x \text{ to}$$

obtain an optimal vector $\tilde{x}_{OPT}$. And the quality of fitting the subset of features to the set of features may be measured at step 410, for instance by computing $\tilde{Z} = \|\tilde{K}\tilde{x}_{OPT} - y\|_2^2 + \lambda \tilde{x}_{OPT}^T \tilde{K} \tilde{x}_{OPT}$.

An important aspect of SRLS Algorithm is the probability distribution $\{p_i\}_{i=1}^n$ input to the algorithm. Although random sampling could be performed with respect to any probability distribution, more intelligent sampling can lead to improved classification performance, both theoretically and empirically. In an embodiment, a subspace sampling probability distribution $$p_i = \frac{\|U_{(i)}\|_2^2}{d}, \forall i \in 1 \ldots n,$$

may be passed to the SRLS Algorithm, where the probability of choosing each feature is proportional to the length squared of the corresponding row of the matrix $U_k$ consisting of the top k left singular vectors of A. More formally, subspace sampling of features representing documents means sampling the features using a probability distribution where the probability of choosing each feature is proportional to the square of the Euclidean norms of the rows of the left singular vectors of an n×d matrix of the features representing a corpus of documents, such as matrix A for instance. Roughly $\tilde{O}(d/\epsilon^2)$ features may be randomly sampled according to this carefully chosen probability distribution. In various embodiments, a subspace sampling probability distribution $$p_i = \frac{\|U_{(i)}\|_2^2}{d}, \forall\, i \in 1\ldots n$$

may be generalized in an embodiment to $p_i = \|U_{k(i)}\|_2^2/k$ to permit k to be a parameter.

Also, note that rather than using the probability distribution $\{p_i\}_{i=1}^n$ over the features directly in r independent and identically distributed sampling trials which might lead to the same feature being chosen multiple times, the SRLS Algorithm computes, for every $i \in \{1, \ldots, n\}$, a probability $\tilde{p}_i = \min\{1, rp_i\} \in [0,1]$, and then the $i^{th}$ row of A is chosen with probability $\tilde{p}_i$. Thus, r actually specifies an upper bound on the expected number of chosen rows of A: if $X_i$ is a random variable that indicates whether the $i^{th}$ row is chosen, then the expected number of chosen rows is $r' = E[\Sigma_i X_i] = \Sigma_i \min\{1, rp_i\} \leq r\Sigma_i p_i = r$.

The SRLS Algorithm may also flexibly use other probability distributions $\{p_i\}_{i=1}^n$ input to the algorithm for randomly sampling features. In various embodiments, weight-based sampling of features may be used, where the probability of choosing each feature is proportional to the length squared of the corresponding row of the matrix A, namely $p_i = \|A_{(i)}\|_2^2/\|A\|_k^2$. Or, uniform sampling of features may be used, where the probability of choosing each feature is equal, such that $p_i = 1/n$, for all $i = 1, \ldots, n$.

Thus the present invention may efficiently select a small set of features by intelligent sampling for improved classification performance. Various probability distributions may be flexibly used for randomly sampling features, and such a feature selection strategy may preserve the relevant geometric structure in the training data. The system and method of the present invention may typically reduce the number of features by an order of magnitude or more from sets of training features and allow small feature sets to represent documents that may change rapidly and require classification to be performed, especially online.

As can be seen from the foregoing detailed description, the present invention provides an improved system and method for feature selection for text classification using subspace sampling. A small subset of features may be selected by randomly sampling a subspace of features from a corpus of training data according to a probability distribution over the set of features. Advantageously, the small set of features may classify texts using only the relevant features among a very large number of training features. Such a system and method may support many web applications for text classification, and may also be applied to other domains where the text is required to be represented by a small number of features. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for classification, comprising:
   a processor device configured to operate as a text classifier using a plurality of features selected by subspace sampling from a corpus of training data for classification of a document;
   selecting a subset from the plurality of features by subspace sampling comprises using a probability distribution over a plurality of features from a corpus of training texts, the probability distribution having a probability assigned to each of the plurality of features that is proportional to a square of Euclidean norms of a plurality of rows of a plurality of left singular vectors of a matrix of the plurality of features representing the corpus of training texts; and
   a storage operably coupled to the text classifier for storing a plurality of texts classified using the plurality of features selected by subspace sampling into a plurality of classes.

2. The system of claim 1 further comprising a text classifier generator operably coupled to the storage for learning a classification function for each of the plurality of classes to train the text classifier for using the plurality of features selected by subspace sampling for classification of the document.

3. The system of claim 1 further comprising a feature selector using subspace sampling operably coupled to the text classifier generator for selecting the plurality of features using subspace sampling from the corpus of training data for classification of the document.

4. A computer-implemented method for classification, comprising:
   using an input/output device receiving a text represented by a plurality of features for classification; and
   using a processor device configured to perform:
     selecting a subset from the plurality of features by subspace sampling using a probability distribution over a plurality of features from a corpus of training texts, the probability distribution having a probability assigned to each of the plurality of features that is proportional to a square of Euclidean norms of a plurality of rows of a plurality of left singular vectors of a matrix of the plurality of features representing the corpus of training texts;
     classifying the text using the subset of the plurality of features; and
     outputting the classification of the text classified using the subset of the plurality of features selected by subspace sampling.

5. The method of claim 4 further comprising receiving a corpus of classified training texts represented by a plurality of features for classification of a document.

6. The method of claim 4 further comprising outputting the subset of the plurality of features.

7. The method of claim 4 wherein selecting the subset of the plurality of features from the plurality of features by subspace sampling comprises randomly sampling a subspace of the plurality of features using a probability distribution with a probability assigned to each of the plurality of features that is proportional to a square of Euclidean norms of a plurality of rows of a plurality of left singular vectors of a matrix of the plurality of features representing the corpus of training texts.

8. The method of claim 4 wherein selecting the subset of the plurality of features from the plurality of features by subspace sampling comprises selecting the subset of the features from the randomly sampled subspace of the plurality of features using a probability distribution with a probability assigned to each of the plurality of features that is proportional to a square of Euclidean norms of a plurality of rows of a plurality of left singular vectors of a matrix of the plurality of features representing the corpus of training texts.

9. The method of claim 4 wherein selecting the subset of the plurality of features from the plurality of features by subspace sampling further comprises defining a kernel matrix over the subset of the plurality of features selected from a sampled subspace of the plurality of features.

10. The method of claim 4 wherein selecting the subset of the plurality of features from the plurality of features by subspace sampling further comprises determining an optimal vector representing the subset of the plurality of features that characterize a classification function using a kernel matrix defined over the subset of the plurality of features.

11. The method of claim 4 further comprising storing an association of the text and a class.

12. A non-transitory computer-readable medium having computer executable instructions for performing steps of:
   receiving a text represented by a plurality of features for classification;
   selecting a subset from the plurality of features by subspace sampling using a probability distribution over a plurality of features from a corpus of training texts, the probability distribution having a probability assigned to each of the plurality of features that is proportional to a square of Euclidean norms of a plurality of rows of a plurality of left singular vectors of a matrix of the plurality of features representing the corpus of training texts;
   classifying the text using the subset of the plurality of features;
   storing a plurality of texts classified using the plurality of features selected by subspace sampling into a plurality of classes; and
   outputting the classification of the text classified using the subset of the plurality of features selected by subspace sampling.

* * * * *